United States Patent
Mizell et al.

(10) Patent No.: US 7,702,311 B2
(45) Date of Patent: Apr. 20, 2010

(54) METHOD FOR EXTENDING CONTENT AWARE ACCOUNTING TO A SERVING GPRS NODE

(75) Inventors: Jerry Mizell, Plano, TX (US); David J. Lauson, McKinney, TX (US); Curtis Provost, Parker, TX (US)

(73) Assignee: Nortel Networks Limited, St. Laurent Quebec (CA)

( * ) Notice: Subject to any disclaimer, the term of this patent is extended or adjusted under 35 U.S.C. 154(b) by 2046 days.

(21) Appl. No.: 10/610,370

(22) Filed: Jun. 30, 2003

(65) Prior Publication Data

US 2004/0266394 A1 Dec. 30, 2004

(51) Int. Cl.
*H04M 11/04* (2006.01)
*H04M 15/00* (2006.01)
(52) U.S. Cl. .................. 455/406; 455/407; 455/408; 379/126
(58) Field of Classification Search .......... 455/406, 455/407, 408, 466, 414.1, 422.1; 379/126, 379/114.2, 114.01
See application file for complete search history.

(56) References Cited

U.S. PATENT DOCUMENTS

| | | | |
|---|---|---|---|
| 6,954,714 B2 * | 10/2005 | Suzuki et al. | 702/182 |
| 6,970,694 B2 * | 11/2005 | Shaheen | 455/414.1 |
| 2002/0002470 A1 * | 1/2002 | Arai | 705/1 |
| 2003/0023550 A1 * | 1/2003 | Lee | 705/40 |
| 2003/0126435 A1 * | 7/2003 | Mizell et al. | 713/168 |
| 2003/0169718 A1 * | 9/2003 | Hirata et al. | 370/338 |
| 2004/0076143 A1 * | 4/2004 | Lee | 370/352 |

OTHER PUBLICATIONS

Mcgee et al. ; Control of Services in Mobile Packet Data Networks; Jun. 5, 2003; WO03/047164.*

* cited by examiner

*Primary Examiner*—Melur Ramakrishnaiah
(74) *Attorney, Agent, or Firm*—Garlick, Harrison & Markison; Kevin L. Smith

(57) ABSTRACT

A serving GPRS node (SGSN) is made content aware by passing content based rate information in the GPRS tunnel protocol (GTP) header. The SGSN uses the PDP context request to inform a GPRS support node (GGSN) that it is content aware and can process the content based rate information. In one embodiment, the rate information is passed in a GTP extension header. A new GTP header type tells the SGSN that rate information is present in the GTP header content field. In an alternate embodiment, the rate information is passed in a fourth octet of a four octet tunnel endpoint identifier (TEID).

17 Claims, 7 Drawing Sheets

Communication network

190 ↘

| version | PT | N/A | E | S | PN |
|---------|----|----|---|---|----|
| message type ||||||
| length 1 ||||||
| length 2 ||||||
| TEID 1 ||||||
| TEID 2 ||||||
| TEID 3 ||||||
| TEID 4 ||||||
| sequence number 1 ||||||
| sequence number 2 ||||||
| N-PDU Number ||||||
| next Extension Header type ||||||

194 ↘

| vendor specific information element | pre-paid indication | rate information |
|---|---|---|
| 198 | 202 | 206 |

FIG. 4

METHOD FOR EXTENDING CONTENT AWARE ACCOUNTING TO A SERVING GPRS NODE

BACKGROUND OF THE INVENTION

1. Technical Field

The present invention relates generally to mobile communication systems and, more particularly, to general packet radio services for delivering data over a circuit switched telephone network.

2. Description of Related Art

A General Packet Radio Service (GPRS) is a non-voice value added service that allows information to be sent and received across a mobile telephone network. It supplements, or rides on top, of today's circuit switched data and short message service networks. The theoretical maximum speed of GPRS includes speeds of up to approximately 171.2 kilobits per second (kbps). This maximum speed is achievable in GPRS systems using all eight timeslots at the same time in a Time Division Multiple Access (TDMA) context.

This speed is about three times as fast as data transmission speeds possible over today's fixed telecommunication networks and ten times as fast as current circuit switched data services on Global System for Mobile Communications (GSM) standard TDMA networks. Thus, GPRS systems are advantageous in that they require less system resources to transmit a fixed amount of data in comparison to using a traditional circuit switched approach. By allowing information to be transmitted more quickly, immediately, and efficiently, across the mobile network, GPRS may well be a relatively less costly mobile data service compared to Short Message Service (SMS) and circuit switched data services.

GPRS also facilitates instant connections in which information can be sent or received immediately as the need arises, subject to radio coverage. No dial up modem connection is necessary. GPRS, similar to some broadband connections for personal computers, often is referred to as being "always connected". Thus, another one of the advantages of GPRS is that data may be transmitted immediately, whenever the need arises. In contrast to circuit switched data networks in which a connection must be established to transmit a data packet or data file, GPRS operation is extremely efficient in those situations in which a small amount of data is to be sent. As the emphasis of many designs today are to create wireless computer networks, and to connect data devices including personal computers to wireless transceivers and mobile terminals, a system that provides instantaneous response such as GPRS is very important for time critical applications, and, more generally, for the implementation of wireless computer networks. For example, a remote credit card authorization system implemented in a wireless network can be greatly improved if it is unnecessary for the customer to wait the amount of time that is required to establish a connection.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software. For example, a gateway GPRS service node (GGSN) and a serving GPRS support node (SGSN) are two such infrastructure nodes.

Another advantage of GPRS is that the packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that larger numbers of GPRS users can share the same bandwidth and be served from a single base station or cell. The actual number of users that may use the system at one time depends, of course, on the amount of data being transferred.

GPRS and a similar and newer technology known as the Universal Mobile Telecommunications System (UMTS) use a packet-mode technique to transfer high speed and low speed data and signaling in an efficient manner to optimize network and radio resources. Strict separation between the radio subsystems and network subsystems is maintained thereby allowing a network subsystem to be reused with other radio technologies. A common packet domain core network is used for both GSM and UMTS. The common core network provides packet switch services and supports differing quality of service (QoS) levels to allow efficient transfer of non-continuous bit rate traffic (for example, bursty data transfers).

The UMTS network, also provides connectionless services. Moreover, GPRS and UMTS support push services. A push service is the delivery of data or multimedia information from a network node to user equipment for the purpose of providing subscriber based information from the network. A push service also can include activating a Packet Data Protocol (PDP) context, if necessary. Examples of delivery networks that offer push services include, as stated, the GPRS network, but can also include other equipment, such as a session initiation protocol (SIP) proxy, a push proxy or an SMS service center. Push services are becoming popular because of their ability to deliver advertisements, as well as subscriber ordered content services such as streaming media, web pages, traffic conditions, sports scores, stock quotes, etc. New services and features being offered require that push capabilities be implemented to enable external Internet protocol networks to deliver data to third generation (3G) wireless terminals in the paging system (PS) domain.

Some of these new services and features are provided by content service providers that charge for the content accessed and applications used. Traditionally, Internet usage has been base on time on-line due to the reliance on the original public switched telephone network (PSTN) that maintained a connected switched circuit regardless of the amount of data transiting the switched circuit. Providing content based billing motivates IP network service providers to charge for content delivered to the mobile subscriber and to adjust the charge for data packets that are not delivered. IP network providers, therefore, need a method for content aware accounting for use in subscriber charging.

Another aspect of 3G evolution is the concept of pre-paid service. In some countries it is estimated that 80% of new mobile subscribers are using the pre-paid service option. It is especially important, therefore, that pre-paid subscribers are charged only for content actually delivered. A need exists, therefore, for a method of creating content aware accounting when delivering content based packets to mobile users. Moreover, many IP network operators are entering into partnership agreements with the content service providers in order to access the revenue stream generated by content based services. Accordingly, accurate content aware accounting is needed to divide the revenue stream. There is a need, therefore, for a system and method that supports content delivery while also providing accurate charging records based on the actual content delivered.

BRIEF SUMMARY OF THE INVENTION

A gateway GPRS service node (GGSN) in a GPRS or UMTS network is capable of inspecting the data packet content. The GGSN, however, does not know how many of the data packets are delivered or how many are lost. The GGSN delivers data packets to a serving GPRS support node (SGSN) that receives data packet acknowledgement from the mobile node. The SGSN is cognizant of the data packets lost and delivered but does not have access to the content based charging information. Accordingly, data packet content based billing has not been possible before now. Data packet charging is, therefore, based only on data packet volume at a fixed rate. The apparatus and method system of the present invention enables GPRS nodes (GGSNs and SGSNs) to support content based data packet delivery while also providing accurate charging records based on the actual content delivered. Using one of a defined GTP extension header or a tunnel endpoint identifier (TEID), the present invention provides content based charging information to the SGSN so that the detailed charging records (CDR) produced by both the GGSN and the SGSN can be reconciled in the charging gateway function (CGF).

In order to generate the CDR containing content based charges, the SGSN and GGSN first create a PDP context using a PDP context request and response handshake thereby establishing the SGSN as context aware. Thereafter, the GGSN will extract the content based charging information from the data packet prior to encapsulating the data packet. The content based charging is forwarded to the SGSN using the GPRS tunneling protocol in a GPRS network. More generally, whether in a GPRS or UMTS network, the content based charging is forwarded from the GGSN to the SGSN.

In one embodiment, a new extension header type is defined. The new extension header type tells the SGSN that the extension header contains, as a minimum, vendor specific information and rate information. The SGSN extracts this information to create the CDR for the data packets delivered to the mobile node. The CDR contains the data packet volume and the charging rate for each type of delivered content based data packets.

In an alternate embodiment, the GGSN uses the last of four TEID fields to pass the charging information to the SGSN. The TEID is a random number created by the GGSN as a downstream tunnel endpoint identifier. In this embodiment, the GGSN uses the first three octets for the TEID, reserving the fourth TEID field to convey the charging information. Not necessarily all of the fourth TEID field is used to convey the charging information. In one embodiment, the SGSN and GGSN exchange version numbers or alternatively bit mask information to tell each other how many bits to use. In this manner, the invention does not have to specify how many bits to use. More specifically, the most significant bit (MSB) is set to indicate the presence of charging rate information while the remaining bits contain the charging rate. The SGSN uses the charging rate information to increment a corresponding charge bucket for the content based data packet. The SGSN decrements the corresponding charge bucket if the data packet was not successfully delivered.

The SGSN creates a charging detail record that documents the data packet volume delivered for each charging rate appropriately adjusted for lost or missing data packets. The GGSN also creates a charging detail record that documents the data packet volume delivered to the SGSN for each charging rate. A charging gateway function (CGF) reconciles the charging detail records to adjust the data packet charges prior to sending the reconciled charging detail records to the network billing function.

BRIEF DESCRIPTION OF THE SEVERAL VIEWS OF THE DRAWINGS

FIG. 4 is GTP header extension method according to one embodiment of the present invention;

DETAILED DESCRIPTION OF THE INVENTION

Figure 1:
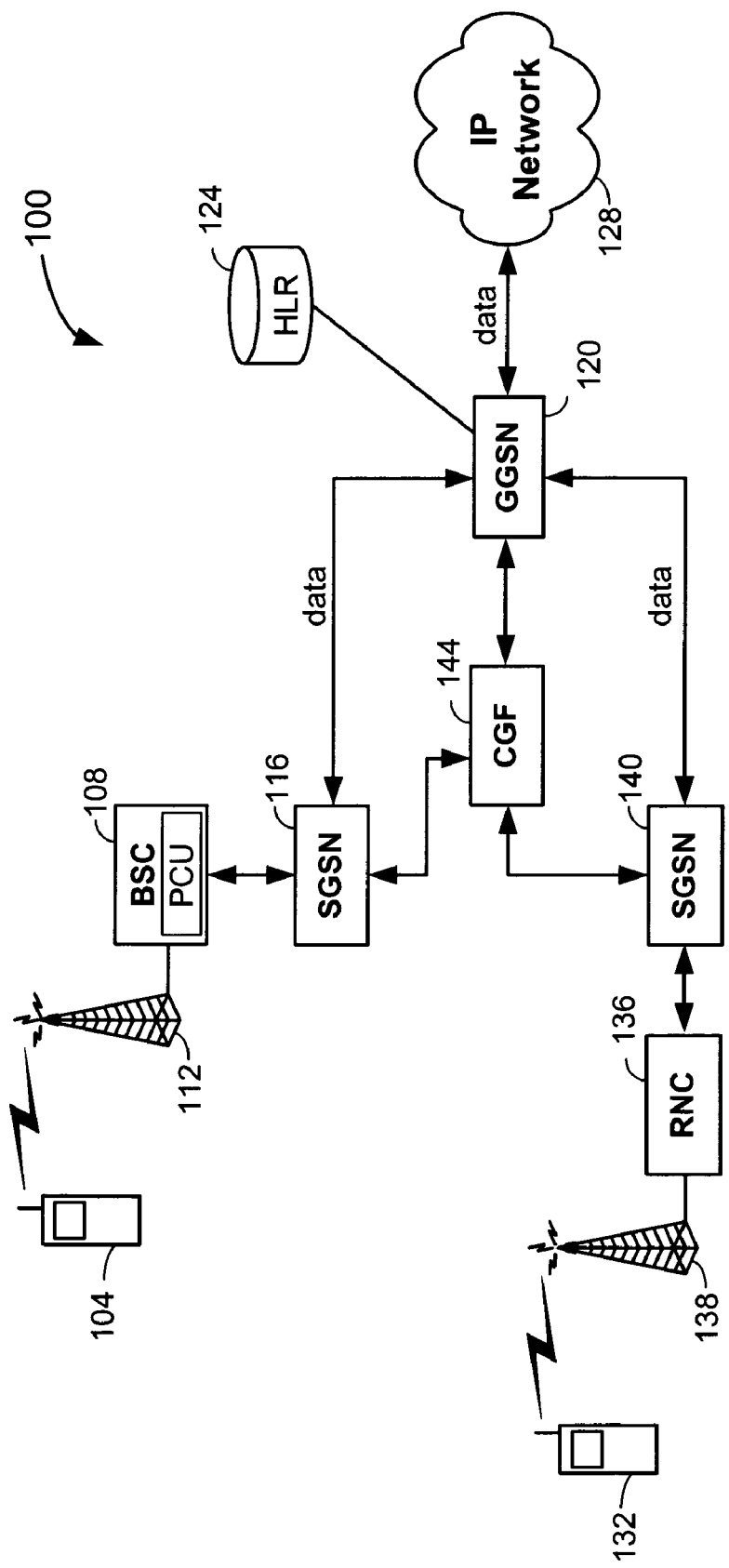
FIG. 1 is a functional block diagram of a communication network formed according to one embodiment of the present invention.

FIG. 1 is a functional block diagram of a communication network formed according to one embodiment of the present invention. The communication network shown generally at 100 includes a mobile node 104 that communicates within a GPRS network. Mobile node 104 is a GPRS-capable and voice-capable mobile terminal that communicates with the GPRS network by way of base station controller (BSC) 108 and tower 112. The BSC 108 includes a packet control unit (PCU) that separates the packet data for transmission to the SGSN by way of the Gb interface. Although shown as part of BSC 108, the PCU could be formed as a separate unit. The GPRS network includes a serving GPRS support node (SGSN) 116 that is operatively coupled to a gateway GPRS support node (GGSN) 120. Additionally, an HLR 124, containing subscriber profile information for both GSM and UMTS networks, is coupled to provide the subscriber profile information to GGSN 120. The SGSN, such as SGSN 116, is for communicating with a mobile node to initiate a data session or connection through a wireless data packet network and providing data packet routing between the mobile node and the GGSN. The GGSN, such as GGSN 120, provides a gateway, as its name suggests, from the wireless data packet network to a traditional data packet network such as an IP network. Thus, as may be seen, GGSN 120 is operatively coupled to IP network 128. A mobile terminal 132 communicates, by way of radio network controller (RNC) 136 and tower 138, with SGSN 140 within a UMTS network. The SGSN 140 connects to GGSN 120 to access IP network 128.

Generally, the SGSN monitors an individual mobile node location and performs related functions such as access control and mobility management. The SGSN connects to the GSM base station through the high-speed frame relay Gb interface and/or to the UMTS RNC through the Iu interface. The SGSN is functionally equivalent to a mobile switching center (MSC) in a voice-only GSM network. The GGSN provides interworking with external packet switched networks that are connected to SGSNs via an IP-based packet domain backbone network. Generally, the GGSN provides an interface between the GPRS/UMTS networks and an external packet switched network such as the Internet.

User data is transferred transparently between the mobile node and external data networks by encapsulating the data and tunneling the data using a GPRS tunneling protocol (GTP). The data packets are equipped with specific protocol information and are transferred between the mobile node and the GGSN. This transparent transfer method lessens requirement to interpret external data protocols and facilitates introduction of additional interworking protocols.

A charging gateway function (CGF) 144 is operably to coupled both SGSNs and to the GGSN. The CGF is a network element that prepares billing records from the call detail records (CDR) received from the SGSNs and the GGSN. Each CDR contains information on data provided to the mobile node such as packet data volume and charging rate for subscriber based content. The CGF forwards the billing records to the network billing center.

As will be described in greater detail below, when the SGSN is formed to be content aware, it will generate a PDP context request informing the GGSN that it is content aware capable. The GGSN responds by creating a PDP context response thereby initiating content based accounting.

Figure 2:
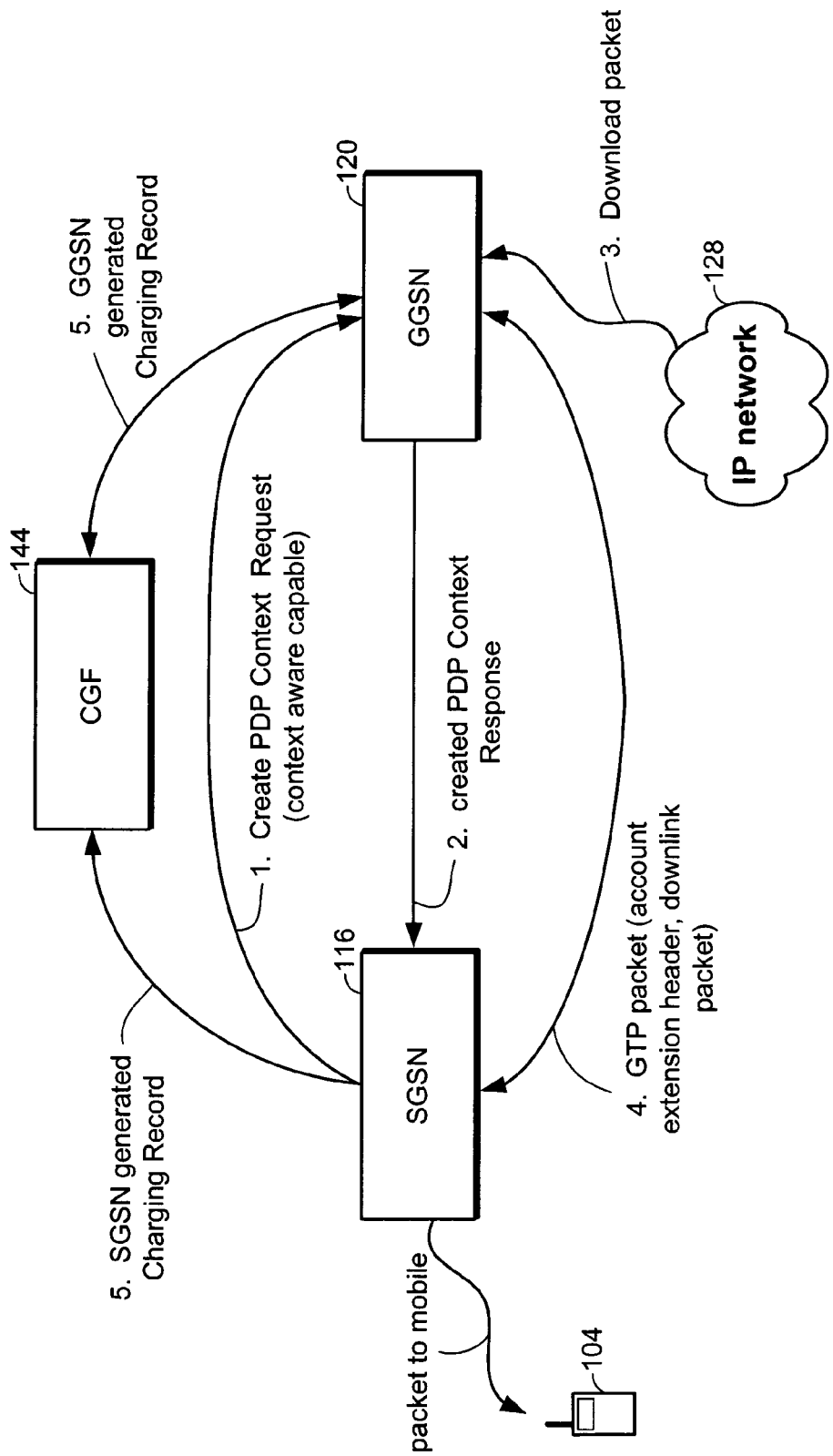
FIG. 2 is functional block diagram of content aware accounting according to one embodiment of the present invention.

FIG. 2 is functional block diagram of content aware accounting according to one embodiment of the present invention. Mobile node 104 is operating in an area served by SGSN 116 and is receiving a data packet delivered by a content service provider by way of IP network 128. SGSN 116, responsible for delivering data packets to the mobile node, creates and sends a PDP context request message to GGSN 120 (step 1). The PDP context request includes a vendor specific information element (IE) to inform the GGSN that the SGSN is capable of processing enhanced packet accounting information. The GGSN will only pass accounting information to the SGSN that included the vendor specific IE in the context creation. GGSN 120 responds with a create PDP context response indicating the request was accepted (step 2). GGSN 120 and SGSN 116 establish a tunnel using a GPRS Tunnel Protocol (GTP). GGSN 120 proceeds to download the packet (step 3) from the content service provider via IP network 128. GGSN 120 inspects the packet for content, source and destination addresses then increments a charging bucket for content delivery to mobile node 104 based on a pre-paid arrangement or according to established partnership agreements between the network operator and the content service provider. GGSN 120 creates a GTP packet by encapsulating the data packet and forwards the GTP packet to SGSN 116 (step 4). GGSN 120 passes accounting information to SGSN 116 with each encapsulated data packet consisting of content information and the appropriate rate against which the packet should be counted.

As described previously, the GGSN is responsible for packet content inspection but has no way of knowing if the packet is actually delivered. Generally, the SGSN forwards the packets to the mobile node and, if context aware, will charge mobile node 104 only for packets successfully delivered (or that it believes were delivered). GGSN 120 and SGSN generate a charging detail record (CDR) containing the number of packets delivered and the rate that each packet should be charged against (step 5). The CDRs are sent to charging gateway function (CGF) 144. CGF 144 is a network element responsible for receiving and reconciling CDRs prior to sending them to a billing service center. Since the GGSN does not know how many packets were actually delivered by the SGSN, the GGSN CDR packet volume count will, most likely, be different from the SGSN CDR packet volume count. CGF 144 correlates the CDRs received from GGSN 120 and SGSN 116 to reconcile differences in volume count and adjust charges to the appropriate rate buckets accordingly.

Figure 3:
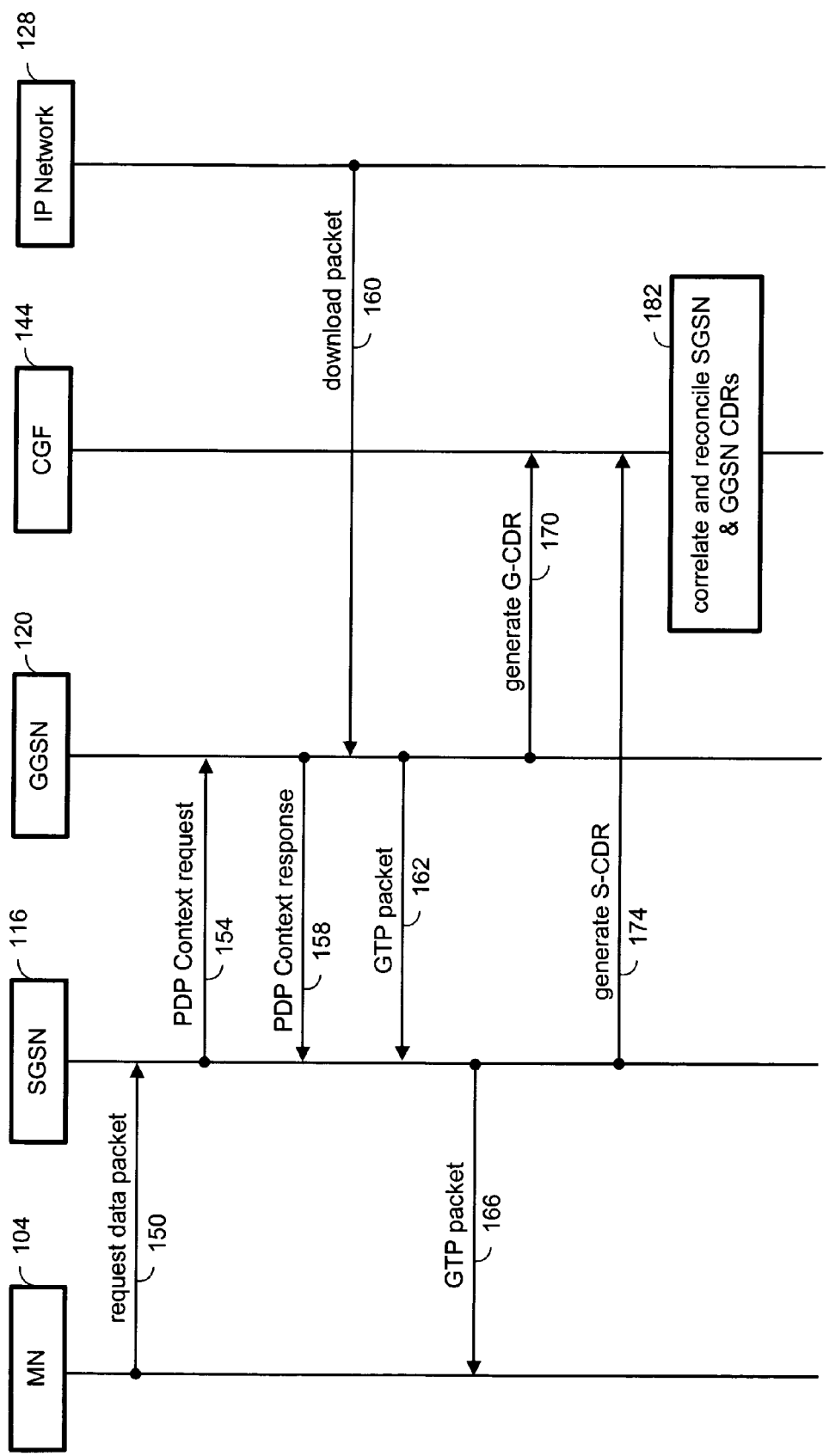
FIG. 3 is a signal flow diagram showing content aware accounting according to one embodiment of the present invention.

FIG. 3 is a signal flow diagram showing content based accounting according to one embodiment of the present invention. Mobile node (MN) 104 being served by SGSN 116 requests a data packet (step 150) from an external data packet network such as IP Network 128. SGSN 116 sends PDP context request (step 154) containing a content aware capable message to GGSN 120. The PDP context request also specifies a tunnel endpoint identifier (TEID) that uniquely identifies the link to MN 104. In response to the PDP context request, GGSN 120 sends PDP context response (step 158) containing a "cause" field value set to "request accepted". SGSN 116 activates the PDP context and begins to download packets (step 160) destined for MN 104.

GGSN 120 receives the data packet, encapsulates it in a GPRS Tunnel Protocol (GTP) packet for delivery to SGSN 116 over the established tunnel. The GTP packet (step 162) contains data that allows SGSN 116 to charge for the content of the data packet. In one embodiment, a GTP extension header is used to transfer the charge rate for the data packet. The GTP header "E" flag is set to indicate the presence of the optional GTP extension header. The GTP extension header content field is filled with the charging rate information. SGSN 116 extracts the charging rate information, charges it to the appropriate mobile node rate bucket, and then forwards the data packet to MN 104.

In an alternate embodiment, the GTP header tunnel endpoint identifier (TEID) field is used to transfer the content rate information when the SGSN is not configured to recognize the optional extension header. The TEID is a random number assigned when the PDP context tunnel is established. In this embodiment, the last octet of the TEID field is reserved for the content rate information. The most significant bit is set to indicate the presence of content rate information while the least significant bits indicate which charging should be used.

SGSN 116 delivers the GTP packet (step 166) to MN 104. Some data packets will be lost due to problems associated with the air link between MN 104 and SGSN 116. When a data packet is lost, SGSN is able to deduct the charge related to the lost packet thereby facilitating accurate charging for content based billing. GGSN 120 generates and GGSN sends call detail record (G-CDR) (step 170) to charging gateway function (CGF) 144. The G-CDR details the number of packets forwarded to SGSN 116 and the charging rate for each packet. Similarly, SGSN 116 generates and sends SGSN CDR (S-CDR) (step 174) to CGF 144. The S-CDR will, most likely, differ from the G-CDR because the SGSN has corrected for any lost or undeliverable data packets thus the S-CDR more accurately reflects the content accessed by MN 104. CGF 144 receives both CDRs, correlates and reconciles the charging records (step 182) accordingly.

FIG. 4 is a GTP extension header method according to one embodiment of the present invention. The GTP header is shown generally at 190. The "E" field will be set to "1" when the optional extension header is used. The next extension header type filed defines the function of the optional extension header. In one embodiment of the present invention, the extension header type is defined as content charging rate information. The SGSN sees the extension header type and knows to extract the charging rate information before forwarding the data packet to the mobile node. The GTP extension header (not shown) comprises three fields: extension header length; extension header content; next extension header type.

The GTP extension header content field is shown generally at 194. A vendor specific information element 198 defines the information necessary for the charging function to accurately distribute the content revenue between network service providers and content service providers according to established partnership agreements. The pre-paid field 202 indicates that the mobile node has paid for content delivery and rate information field 206 contains the data packet charging rate.

Figure 5:
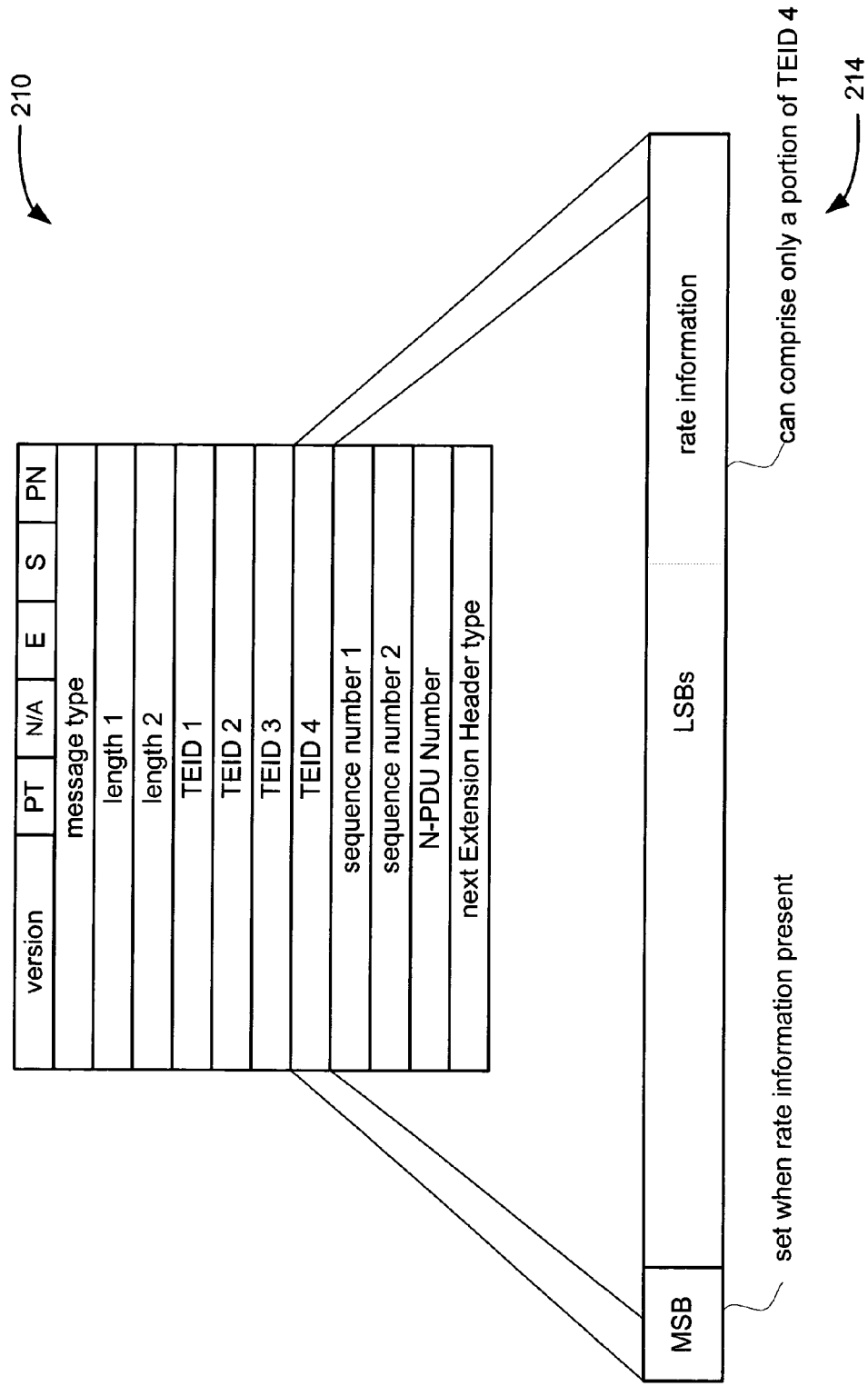
FIG. 5 is TEID method according to an alternate embodiment of the present invention.

FIG. 5 is a TEID method according to an alternate embodiment of the present invention. The GTP header, shown generally at 210, includes four TEID fields, wherein each field is one octet long. In the alternate embodiment, the fourth TEID field (TEID 4) is used for passing rate information. The TEID is a random number assigned by either the GGSN or the SGSN and thus can be formatted to pass the content rate information. As shown generally at 214, the fourth TEID field will have the most significant bit (MSB) set to indicate the presence of rate information while the remaining seven least significant bits (LSBs) convey the content rate information.

Figure 6:
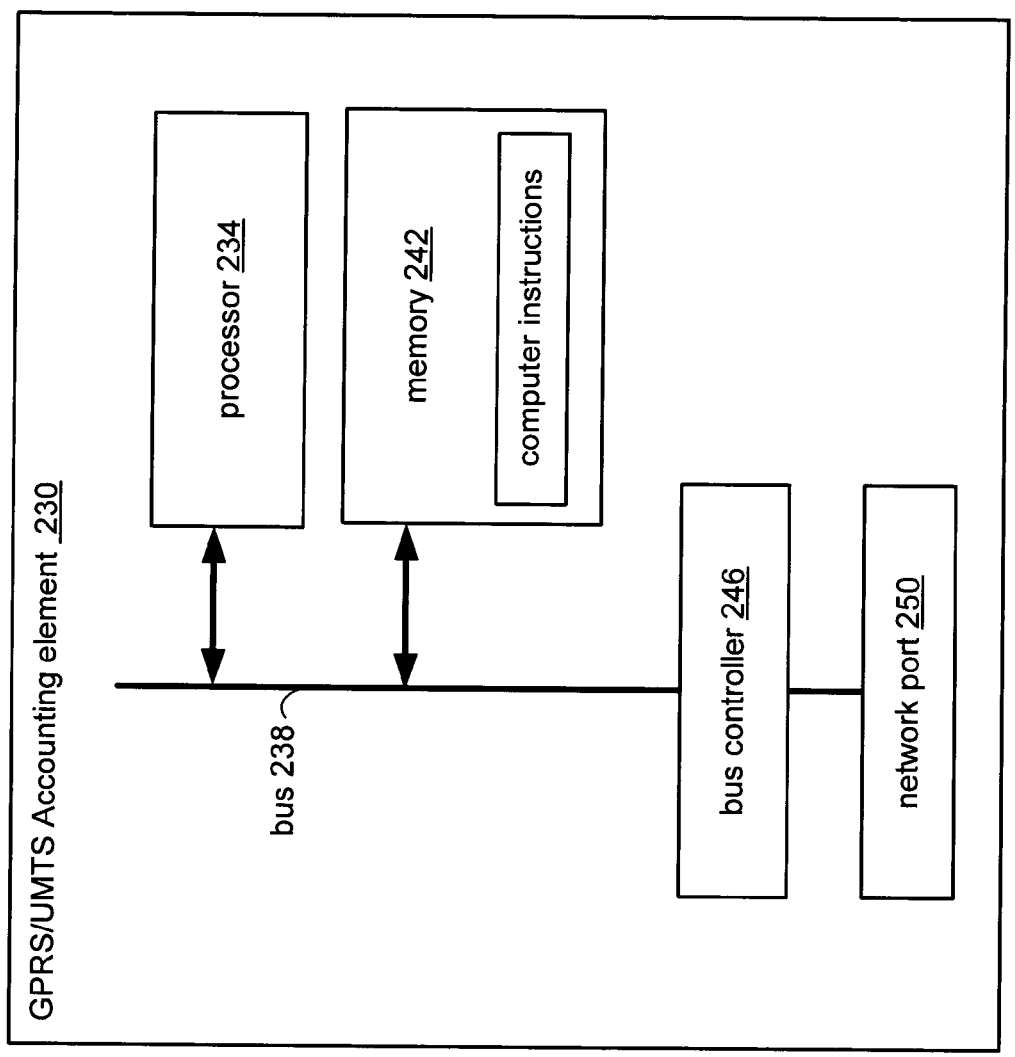
FIG. 6 is a GPRS/UMTS accounting element of the present invention.

FIG. 6 is a GPRS/UMTS accounting element of the present invention. GPRS/UMTS 230 includes a processor 234 that is coupled to communicate over a bus 268. A memory 242 further is coupled to bus 238 and is for storing computer instructions that define the operational logic of GPRS/UMTS 230. Bus 238 is coupled to a bus controller 246, which controls the communications and timing of communications thereon. Bus controller 246 is operably coupled to a network port 250 for receiving communications from external data packet networks.

In operation, processor 234 communicates with memory 242 by way of bus 238 to retrieve computer instructions stored therein and to execute the computer instructions to operate according to the logic defined within the computer instructions of memory 242. Memory 242 specifically includes computer instructions to generate a call detail record responsive to receiving a plurality of content based data packets. Additionally, computer instructions stored in memory 242 define logic for charging rate buckets according to the rate information contained in the content based data packets.

Thus, for example, when GPRS/UMTS 230 receives a packet destined for a mobile node, computer instructions stored in memory 242 include logic to prompt the processor to extract the packet volume and corresponding rate charges. Computer instructions stored in memory 242 further prompt processor 234 generate a call detail record responsive to receiving the data pack volume.

Figure 7:
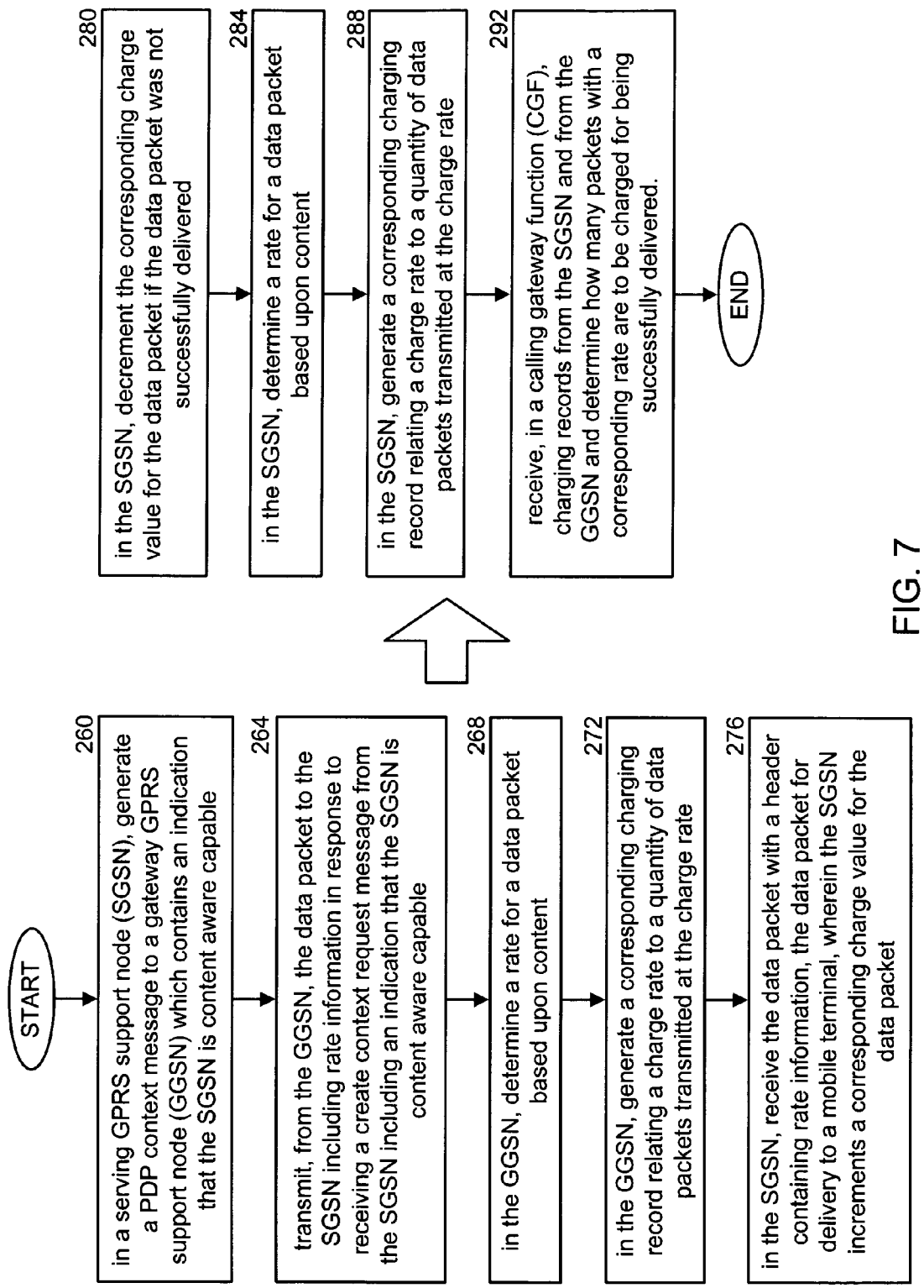
FIG. 7 is a flow chart illustrating a method for billing a mobile terminal in a general packet radio service (GPRS) network according to one embodiment of the present invention.

FIG. 7 is a flow chart illustrating a method for billing a mobile terminal in a general packet radio service (GPRS) network according to one embodiment of the present invention.

Responsive to the mobile terminal requesting access to a packet network, a serving GPRS support node (SGSN) generates a PDP context request message to a gateway GPRS support node (GGSN) which contains an indication that the SGSN is content aware capable (step 260). The GGSN and SGSN create a tunnel using the GPRS Tunnel Protocol (GTP) to establish a link between the external data packet network and the mobile node. The GGSN transmits data packets to the SGSN including rate information in response to receiving the create context request message from the SGSN including an indication that the SGSN is content aware capable (step 264).

As the data packets are received by the GGSN, they are inspected for content and a corresponding charging rate. The GGSN determines the charging rate for each data packet based upon content (step 268). The GGSN encapsulates the data packet into a GTP packet that includes the charging rate for each encapsulated data packet. After forwarding the GTP data packet to the SGSN, the GGSN generates a corresponding charging detail record relating a charge rate to a quantity of data packets transmitted at the charge rate (step 272).

The SGSN receives the encapsulated data packet containing the rate information. The encapsulation is removed and the data packet is delivered to the mobile terminal, wherein the SGSN increments a corresponding charge value for the data packet (step 276). In the SGSN, decrement the corresponding charge value for the data packet if the data packet was not successfully delivered (step 280). In the SGSN, determine a rate for a data packet based upon content (step 284) as defined in the received GTP packet header. The rate information is defined, in one embodiment, by a GTP extension header. In an alternate embodiment, a TEID field in the GTP header is used to convey the rate information. In the SGSN, generating a corresponding charging record relating a charge rate to a quantity of data packets transmitted at the charge rate (step 288).

The charging gateway function (CGF) receives charging records from both the SGSN and the GGSN and determines how many packets with a corresponding rate are to be charged for being successfully delivered (step 292). By correlating the received charging records, the CGF corrects for undeliverable or lost data packets prior to preparing billing information for the network billing function.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for billing a mobile terminal in a general packet radio service (GPRS) network, comprising:
   determining a rate for a data packet based upon content; and
   generating a corresponding charging record relating a charge rate to a quantity of data packets transmitted at the charge rate, wherein the corresponding charging record is based upon a number of successfully delivered data packets of the quantity of data packets.

2. The method of claim 1 wherein the method is performed by a Gateway GPRS Support Node (GGSN) and wherein the GGSN transmits the data packet to a Serving GPRS Support Node (SGSN) including rate information in response to receiving a create context request message from the SGSN including an indication that the SGSN is content aware capable.

3. The method of claim 1 wherein the method is performed by a Serving GPRS Support Node (SGSN) and wherein the SGSN receives the data packet, which includes a header containing rate information, for delivery to a mobile terminal, wherein the SGSN increments a corresponding charge value for the data packet.

4. The method of claim 3 wherein the SGSN decrements the corresponding charge value from the corresponding charging record for the data packet if the data packet was not successfully delivered.

5. The method of claim 3 wherein the SGSN generates a packet data protocol (PDP) context message to a Gateway GPRS Support Node that contains an indication that the SGSN is content aware capable.

6. The method of claim 1 wherein the method is performed by a charging gateway function (CGF) and wherein the CGF receives charging records from a Serving GPRS Support Node (SGSN) and from a Gateway GPRS Support Node (GGSN) and determines the number of successfully delivered data packets and a corresponding rate to charge.

7. A General Packet Radio Service/Universal Mobile Telecommunications System (GPRS/UMTS) accounting element, comprising:
   a processor for executing computer instructions stored in memory,
   a bus coupled to the processor; and
   a memory for storing computer instructions that define operational logic for the accounting element, wherein the memory is coupled to the bus to enable the processor to retrieve and execute the computer instructions, wherein the operational logic:
      determines a rate for the data packet based upon content; and
      generates a corresponding charging record relating a charge rate to a quantity of data packets transmitted at the charge rate, wherein the quantity of data packets reflects a number of successfully delivered data packets.

8. The GPRS/UMTS accounting element of claim 7 wherein the accounting element is a Gateway GPRS Support Node (GGSN).

9. The GPRS/UMTS accounting element of claim 7 wherein the accounting element includes computer instructions that further define logic to:
   prompt the GGSN to create an extension header for a data packet to be transmitted to a Serving GPRS Support Node (SGSN) detailing rate information for the data packet.

10. The GPRS/UMTS accounting element of claim 7 wherein the accounting element sends a charging record to a charging gateway function detailing a number of data packets transmitted to an SGSN for delivery to a mobile terminal and the rate for each of the data packets.

11. The GPRS/UMTS accounting element of claim 7 wherein the accounting element includes a Serving GPRS Support Node (SGSN).

12. The GPRS/UMTS accounting element of claim 11 wherein the accounting element includes computer instructions that further define logic to:
   prompt the SGSN to generate a create packet data protocol (PDP) context request to a Gateway GPRS Support Node (GGSN) indicating that the SGSN is content aware capable.

13. The GPRS/UMTS accounting element of claim 11 wherein the accounting element includes computer instructions that further define logic to:
   prompt the SGSN to receive a data packet, read one of an extension header or a tunnel endpoint identifier (TEID) field to determine a corresponding rate for the data packet and to increment a corresponding charge value.

14. The GPRS/UMTS accounting element of claim 13 wherein the accounting element includes computer instructions that further define logic to:
   prompt the SGSN to produce the quantity of data packets by decrementing the corresponding charge value if the data packet was not successfully delivered to the mobile terminal.

15. The GPRS/UMTS accounting element of claim 7 wherein the accounting element includes computer instructions that further define logic to:
   prompt a Serving GPRS Support Node (SGSN) to generate a charging report to a charging gateway function detailing the number of successfully delivered data packets at a corresponding rate.

16. The GPRS/UMTS accounting element of claim 7 wherein the accounting element includes a charging gateway function (CGF).

17. The GPRS/UMTS accounting element of claim 16 wherein the accounting element includes computer instructions that further define logic to:
   prompt the CGF to receive charging records from a Serving GPRS Support Node (SGSN) and from Gateway GPRS Support Node (GGSN), to compare the charging records, and to determine what charge applies.

* * * * *